Nov. 16, 1926.  1,607,285
R. D. KRIMBLEBINE
FISHING ROD AND REEL
Filed May 19, 1926
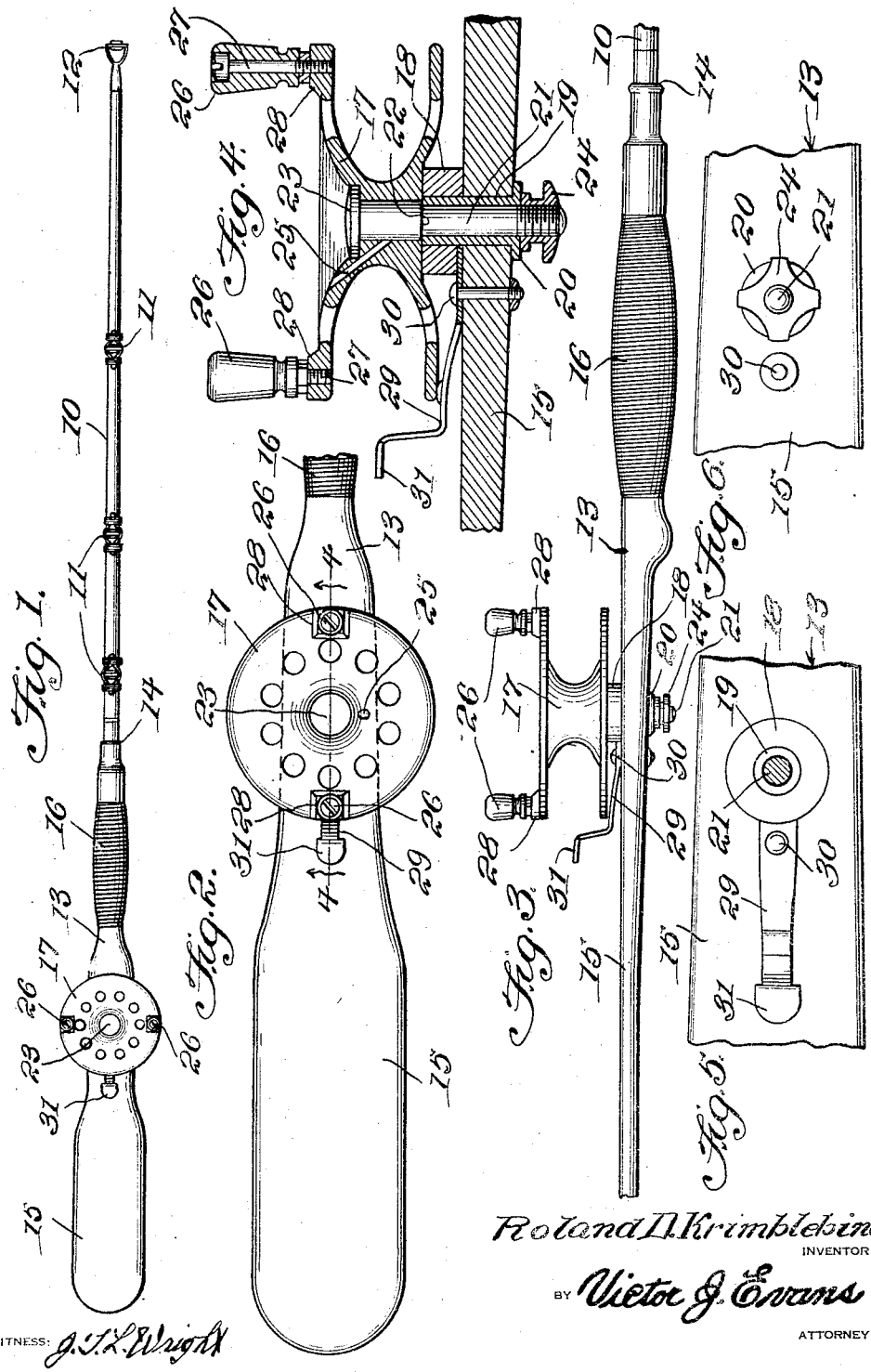

Patented Nov. 16, 1926.

1,607,285

UNITED STATES PATENT OFFICE.

ROLAND D. KRIMBLEBINE, OF KENTON, OHIO; BESSIE KRIMBLEBINE ADMINISTRATRIX OF SAID KRIMBLEBINE, DECEASED.

FISHING ROD AND REEL.

Application filed May 19, 1926. Serial No. 110,281.

This invention relates to improvements in fishing rods and reels, especially designed for use in catching large fish, such as maskalonge and other kinds of pike, bass, trout, sturgeon and other game and deep sea fish.

An object of the present invention is the provision of a rod which will greatly facilitate the landing of a large game fish by providing means for holding the rod to prevent turning or twisting, so that the reel will be kept in proper position and the line prevented from being wedged or tangled between the reel and rod, due to accidental turning or twisting of the rod.

Another object of the invention is the provision of novel means for mounting the reel upon the rod so that the said reel may be readily removed and replaced, together with convenient means for controlling the reel so that the line may be kept at a proper tautness.

With the above and other objects in view, the invention further includes the following novel features and details of construction, to be hereinafter more fully described, illustrated in the accompanying drawings and pointed out in the appended claims.

In the drawings:—

Figure 1 is a side elevation of the invention.

Figure 2 is an enlarged fragmentary side view showing the stock with the reel mounted thereon.

Figure 3 is an edge view of the same with the hand grip included.

Figure 4 is an enlarged fragmentary sectional view taken substantially on the line 4—4 of Figure 2.

Figure 5 is a fragmentary elevation showing a portion of the stock with the spindle bolt of the reel in section.

Figure 6 is a fragmentary elevation looking at the opposite side of the stock from that illustrated in Figure 2.

Referring to the drawings in detail wherein like characters of reference denote corresponding parts, the reference character 10 indicates a fishing rod made of suitable material and of a desired length, it being preferred to manufacture the rod of well seasoned hickory so that it will be pliable and practically unbreakable and to regulate its length so that the fisherman will be enabled to land his catch without assistance. The rod is provided with suitable spaced guides 11 for the passage of the line and with a tip 12. The rod further includes a handle section 13 which is detachably connected to the rod 10 by means of a slip joint indicated at 14.

The handle section 13 includes a stock 15 which is formed of suitable relatively wide flat material so that it may be held between the arm and body of the user and when held between the body and left arm, the left hand of the user is designed to grasp a grip 16 located adjacent the inner end of the rod 10 and preferably formed on the handle section 13.

Mounted for rotation upon one side of the stock 15 is a reel 17. This reel is spaced from the stock 15 by means of a spacing block 18, while the latter is secured to the stock and has passing therethrough a bearing sleeve 19. This sleeve extends through the stock and is provided with a flange 20. The sleeve 19 is designed to removably receive a spindle bolt 21 which is provided with a shoulder 22, the said spindle bolt extending through the reel 17 and being provided with a head 23 which is preferably countersunk within the outer face of the reel. The shoulder 22 of the bolt 21 is designed to bear against one end of the sleeve 19, while a nut 24 which is threaded upon the bolt 21 bears against the opposite end of the sleeve. The reel 17 is thus removably mounted for free rotation.

An oil passage 25 is provided in the reel which extends to the bore and to the countersunk portion which accommodates the head of the spindle bolt. The reel is preferably provided with handles 26 which are removably held in place by screws 27 whose inner ends are threaded into bosses 28 extending from the face of the reel.

The reel 17 is thus mounted so that it may be conveniently operated by the free hand of the user, one end grasping the grip 16 while the other operates the reel. The manner of holding the rod prevents the same from twisting during the operation of landing a fish and thus prevents the line from becoming tangled or wedged between the reel and rod.

A resilient arm 29 has one end secured to the stock 15 as indicated at 30 and is adapted to frictionally engage the reel 17 to provide a brake, the frictional engagement being preferably sufficient to ordinarily hold the reel against accidental rotation. The free end of the arm 29 is provided with a finger piece 31 by means of which the arm may be regulated to apply further braking action to the reel.

The invention is susceptible of various changes in its form, proportions and minor details of construction and the right is herein reserved to make such changes as properly fall within the scope of the appended claims.

Having described the invention what is claimed is:—

1. In a fishing rod, a relatively wide flat stock at the inner end of the rod, means to mount a reel at the inner end of the stock and a hand grip between the inner end of the rod and the reel attaching means.

2. In combination, a rod, a relatively wide flat stock at the inner end thereof, a reel mounted for rotation upon one side of the stock and a hand grip between the inner end of the rod and the reel.

3. In combination, a rod, a relatively wide flat stock at the inner end thereof, a reel mounted for rotation upon one side of the stock, a resilient brake arm having one end secured to the stock and frictionally engaging the reel and a hand grip between the inner end of the rod and reel.

4. In combination, a rod, a relatively wide flat stock at the inner end thereof, a reel mounted for rotation upon one side of the stock, a spacing block positioned between the stock and reel, a bearing sleeve extending through the stock and block, a spindle bolt extending through the reel and sleeve and a shoulder provided upon the bolt to engage the end of the sleeve adjacent the reel to provide for free rotation of said reel, a binding nut mounted upon the bolt and engaging the opposite end of the sleeve and a hand grip for the rod.

5. In a fishing rod, a relatively wide flat stock at the inner end of the rod.

6. In a fishing rod, a relatively wide flat stock at the inner end of the rod and a hand grip adjacent the inner end of the flat stock.

In testimony whereof I affix my signature.

ROLAND D. KRIMBLEBINE.